US010715341B2

(12) United States Patent
Yseboodt

(10) Patent No.: US 10,715,341 B2
(45) Date of Patent: Jul. 14, 2020

(54) POWERED DEVICE IN POWER-OVER-ETHERNET NETWORK SYSTEM, AND METHODS THEREFORE

(71) Applicant: SIGNIFY HOLDING B.V., Eindhoven (NL)

(72) Inventor: Lennart Yseboodt, Retie (BE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/556,110

(22) PCT Filed: Feb. 19, 2016

(86) PCT No.: PCT/EP2016/053579
§ 371 (c)(1),
(2) Date: Sep. 6, 2017

(87) PCT Pub. No.: WO2016/142152
PCT Pub. Date: Sep. 15, 2016

(65) Prior Publication Data
US 2018/0278428 A1    Sep. 27, 2018

(30) Foreign Application Priority Data

Mar. 6, 2015  (EP) ..................................... 15158071

(51) Int. Cl.
*H04L 12/10* (2006.01)
*G06F 1/26* (2006.01)
(Continued)

(52) U.S. Cl.
CPC .............. *H04L 12/10* (2013.01); *G06F 1/266* (2013.01); *H04L 12/40045* (2013.01);
(Continued)

(58) Field of Classification Search
CPC . H04L 12/10; H04L 12/40045; H04L 69/324; G06F 1/266; Y02D 30/32; Y02D 30/30
See application file for complete search history.

(56) References Cited

U.S. PATENT DOCUMENTS

| 7,355,416 | B1 * | 4/2008 | Darshan | ................. H04L 12/10 324/713 |
| 10,060,965 | B1 * | 8/2018 | Skinner | ................ G01R 31/086 |

(Continued)

OTHER PUBLICATIONS

Lennart, Yseboodt, et al., "Autoclass II," v160, Phillips Research, Jan. 11, 2015 (16 pages) (Year: 2015).*

(Continued)

*Primary Examiner* — Christine Ng
(74) *Attorney, Agent, or Firm* — Meenakshy Chakravorty

(57) ABSTRACT

The present invention relates to a Powered Device (PD) in a Power-over-Ethernet (PoE) system. The invention proposes that the PD selectively transmit to a Power Sourcing Equipment (PSE) a power request based on the support of that PSE for autoclass. An autoclass supporting PSE will determine the maximum power that needs to be allocated to the PD based on measuring the power used by the autoclass supporting PD during classification. If the PSE does not support autoclass, it will instead allocate a default maximum power (based on the classification) to the PD. When the PD is operational it determines whether autoclass is supported by the PSE (230). If autoclass is supported then no power request should be sent (250) as otherwise the PSE will allocate power based on this request instead of on the more accurate measurement.

9 Claims, 2 Drawing Sheets

(51) Int. Cl.
*H04L 12/40* (2006.01)
*H04L 29/08* (2006.01)

(52) U.S. Cl.
CPC ............ *H04L 69/324* (2013.01); *Y02D 30/30* (2018.01); *Y02D 30/32* (2018.01)

(56) References Cited

U.S. PATENT DOCUMENTS

| | | | |
|---|---|---|---|
| 2007/0135086 A1* | 6/2007 | Stanford | H04L 12/10 455/402 |
| 2007/0237322 A1* | 10/2007 | Hussain | H04L 12/40045 379/413 |
| 2013/0013949 A1 | 1/2013 | Mohammed | |
| 2014/0129853 A1* | 5/2014 | Diab | H04L 12/413 713/310 |
| 2016/0127135 A1* | 5/2016 | Balasubramanian | H04L 12/10 713/300 |
| 2016/0204949 A1* | 7/2016 | Theunissen | H05B 37/0254 307/1 |

OTHER PUBLICATIONS

Lennart Yseboodt, et al, "Autoclass II," V160, Philips Research, Jan. 11, 2015 (16 Pages).
David Abramson, "IEEE P802.3BT Mutual Identification," IEEE802. 3BT Interim Meeting, Sep. 2014 (17 Pages).

* cited by examiner

POWERED DEVICE IN POWER-OVER-ETHERNET NETWORK SYSTEM, AND METHODS THEREFORE

CROSS-REFERENCE TO PRIOR APPLICATIONS

This application is the U.S. National Phase application under 35 U.S.C. § 371 of International Application No. PCT/EP2016/053579, filed on Feb. 19, 2016, which claims the benefit of European Patent Application No. 15158071.9, filed on Mar. 6, 2015. These applications are hereby incorporated by reference herein.

FIELD OF THE INVENTION

The invention relates to a powered device (arranged for use in a Power-over-Ethernet network system), a method of operating such a powered device and a computer program for operating such a powered device.

BACKGROUND OF THE INVENTION

Power-over-Ethernet (PoE) is described in the most recent standard, IEEE Standard 802.3af-2003, Part 3: Carrier Sense Multiple Access with Collision Detection (CSMA/CD) Access Method and Physical Layer Specifications, Amendment: Data Terminal Equipment (DTE) Power via Media Dependent Interface (MDI); IEEE Computer Society. By means of PoE, power is supplied to detached data equipment and peripherals (like routers, switches, printer spoolers etc.) through the same wire or network connection that is already used to connect these to the Ethernet (network). There are plans to make use of the same standard for all kinds of low power loads such as, e.g., lighting equipment (sensors, switches, light sources etc.) or entertainment appliances like active speakers, internet radios, DVD players, set-top boxes and even TV sets. Standardization in IEEE Standard 802.3 is proceeding to support power levels of, e.g., up to 100 W per Cat5/6 connection.

As PoE supply systems for power distribution inside buildings come into the focus of the industry, some specific usage aspects of these networks need to be solved in order to get these direct current powered networks (so called "DC-Grids") widely employed. Historically, when the PoE standard was introduced for supplying power to detached networking devices like routers, switches, printer spoolers, etc., it was a replacement for small power-plug type power supplies, since the originally intended loads where mostly already equipped with communication and processing means.

As indicated above, an example of powered devices may be light sources, but also sensors or actuators. Typically, two links between power sourcing equipment (PSE) and powered device (PD) are foreseen. A power delivery link is established after detection and classification. Subsequently, a data link is established for the traditional Ethernet data.

In standardization activities for PoE one aspect that is of interest relates to power allocation. The 802.3af standard allowed a PSE to distinguish between several power classes and the 802.3 at standard added support for an additional power class as well as continuous negotiation between PSE and PD. The ability for the PSE to query the PD in order to determine the power requirements of that PD is called classification. The interrogation and power classification function is intended to establish mutual identification and is intended for use with advanced features such as power management. There are two forms of classification: Physical Layer classification and Data Link Layer classification. Physical Layer classification occurs before a PSE supplies power to a PD when the PSE asserts a voltage onto the physical interface and the PD responds with a current representing a limited number of power classifications. With Data Link Layer classification, the PSE and PD communicate using the Data Link Layer Protocol after the data link is established. The Data Link Layer classification has finer power resolution and the ability for the PSE and PD to participate in dynamic power allocation wherein allocated power to the PD may change one or more times during PD operation.

The improved classification features in the 802.3 at standard can be used, compared to the 802.3af standard, to prevent a PSE from allocating too much power to a PD, i.e. a power limit that the PD will never use, having as a consequence that the overage is reserved without due reason. However, a more advanced power allocation approach is required to further optimize the power allocation.

A new standard is being developed for PoE, the 802.3bt standard, which will introduce a new classification mechanism: autoclass. Autoclass is a classification mechanism that allows a PD to communicate its effective maximum power consumption to the PSE. This happens in such a way that the PSE will be able to set the power budget to the effective maximum PD power including the effective channel losses (e.g. losses realized over the Ethernet connection between PSE and PD). This will allow more efficient use of the Power Supply Unit (PSU) of the PSE since only the effectively used power needs to be budgeted. Autoclass is performed as part of the classification process, where a PSE determines what class to assign to a connected PD. In autoclass mode the PD consumes maximum power for a short period during classification and the PSE measures the power consumed. The PSE will then allocate power to the PD based on this measurement.

The presentation "Autoclass II v160" in the context of the "IEEE P802.3bt 4-Pair Power over Ethernet (4PPoE)—Jan. 2015 Interim Meeting" from Jan. 14-16, 2015 in Atlanta, Ga., USA et al discloses an introduction to parts of the above mentioned autoclass principles.

The presentation "IEEE P802.3bt Mutual Identification" in the context of the "IEEE P802.3bt 4-Pair Power over Ethernet (4PPoE)—Sep. 2014 Interim Meeting" from Sep. 10-12, 2014 in Kanata, OT, Canada discloses a mutual identification scheme for both the PD and PSE to learn the capabilities/requirements of the other.

SUMMARY OF THE INVENTION

Next to being triggered at the physical layer (i.e. as part of the classification process), Link Layer Discovery Protocol (LLDP) can also be used to (re-)trigger or cancel autoclass. Triggering autoclass via LLDP is a solution for PDs that cannot meet the startup timing requirements of physical layer autoclass (e.g. PDs that cannot consume maximum power shortly after being powered up). Autoclass can provide for more accurate power allocation than Data Link Layer classification, for example, as it takes into account actual cables losses. However, when a PSE and a PD feature autoclass support yet the PD sends Data Link Layer classification, the Data Link Layer classification will overrule the power allocation determined based on the autoclass feature. This can then lead to less accurate power allocation.

It is an object of the present invention to provide an improved powered device, an improved method of operating a powered device and a computer program for operating a powered device.

In an aspect of the invention, there is provided a powered device for receiving power from a power sourcing equipment via a communication link (e.g. an Ethernet cable or other cable allowing power distribution and data communication), the powered device comprising: a communication unit arranged for transmitting, over the communication link, a power request; and a controller unit arranged for controlling the powered device in a maximum power mode during a classification phase of said powered device. The powered device (e.g. the controller unit) is arranged for determining a type information related to the power sourcing equipment, and the communication unit is further arranged for selectively transmitting the power request based on the determined type information (e.g. the controller unit controls the communication unit to transmit the power request based on the determined type information). This is beneficial as it allows, for example, the PD to send the power request only when this leads to better power allocation (e.g. more efficient power allocation at the side of the PSE) or to send the power request only when the power allocated to the PD needs to be determined by the PD (e.g. if the PD has determined that the power allocated using autoclass is insufficient, for example, based on maximum power not being available after the classification phase). Whether or not a PSE supports autoclass can be determined based on any of: information provided by the PSE (e.g. via LLDP), determined based on power characteristics of the power provided by the PSE to the PD (e.g. based on the classification process), determined based on settings stored as part of an installation or commissioning procedure, determined based on rule based determination (e.g. if PSE's manufacturer name equals 'brand name' then send power request), etc.

In various embodiments of the powered device according to the invention, the powered device is arranged for determining the type information based on power received from the power sourcing equipment via the communication link and/or based on type indicator data received. Such type indicator data can, for example, be received over a wireless communication link, can be received or retrieved from a local memory, etc. In an advantageous embodiment the type indicator data is received via the communication link, for example, from a device in the network that the PD is part of, such as from the power sourcing equipment. The type indicator data can comprise a PSE manufacturer code, network or network devices names, etc. and this data can be received in one or more formats. In a particularly beneficial embodiment the type indicator data is received as a Link Layer Discovery Protocol message.

In a further embodiment of the powered device according to the invention, the determined type information specifies support of the power sourcing equipment for autoclass. When the PD can determine whether or not autoclass is supported by the PSE, the communication unit can be arranged for transmitting the power request when the determined type information indicates support of the power sourcing equipment for autoclass. When support for autoclass can be unambiguously determined, e.g. because the PSE sends an LLDP message specifying its support for autoclass, then it can be easily determined whether or not to send the power request (e.g. as an LLDP message). When support of the PSE for autoclass is uncertain (e.g. if no LLDP message from the PSE is received), e.g. if the type indicator data indicates that the PSE might or might not support autoclass, determining whether or not to send a power request can be based on more complex logic. For example, if a PD requires for optimal operation 8W of power, then preferably it is recognized as a Class 3 PD by the PSE and using the autoclass feature less than the maximum amount of power for Class 3 PDs is allocated to the PD. If the PSE only supports PDs up to Class 2 and the PD is able to function as a Class 2 PD (e.g. by limiting its functionality, such as by limiting the light output if the PD is a luminaire) then it can be undesirable to limit the power allocation to anything below the maximum power allocated to a PD of Class 2.

In a further aspect of the invention, there is provided a method of operating a powered device for receiving power from a power sourcing equipment via a communication link (e.g. an Ethernet cable or other cable allowing power distribution and data communication), the method comprising: providing a classification information to the communication link, controlling the powered device in a maximum power mode during a predetermined period, determining a type information related to the power sourcing equipment, and selectively transmitting a power request based on the determined type information. In the following example, the PD is coupled to a PSE via an Ethernet cable and the PSE identifies the PD based on the presence of a 25 k Ohm resistor (i.e. detecting a signature resistance between 19 and 26.5 k Ohm). The PD would then apply the method, by providing classification information to the communication link (e.g. by providing a power consumption signature, by placing a specific resistance over one or more pairs in the cable). As the PSE, knowing the class the PD is in, provides power over the communication link to the PD some sort of current inrush could occur. The PD goes into a maximum power mode, for example after the inrush, and a PSE supporting the autoclass feature will then measure the power used by the PD. The maximum power mode can comprise the PD turning fully on the load that is part of it or which it powers (e.g. if the load is a luminaire, the light sources can be dimmed up to achieve maximum light output and maximum power usage) or alternatively it can comprise the PD turning on a dedicated circuit (e.g. the maximum power usage could be simulated, such as through a resistor dissipating an amount of power equal to the maximum amount of power the load would require). The PD will go from the maximum power mode to, for example, a normal (or operational) power mode after a predetermined amount of time (e.g. as specified by the PoE standard). In various scenarios the PSE can then send information to the PD, the PD can retrieve information (e.g. from a memory), the PD can request information (e.g. from the PSE), etc. to determine a type information related to the power sourcing equipment. The determined type information is used to determine whether or not a power request (e.g. as an LLDP message) is to be sent to the PSE.

In yet a further aspect of the invention, a computer program product is provided for operating a powered device for receiving power via a communication link, the computer program comprising program code means for causing the powered device to carry out the steps of the method of operating a powered device, when the computer program is run on a computer controlling the powered device. Such a computer program product can be stored in a memory of the PD such that the PD can execute it. As a further example, it can be downloaded by the PD as part of, for example, a firmware upgrade.

Herein, the term "power sourcing equipment" (PSE) may, e.g., refer to a DTE or midspan device that provides the power to a single link section (i.e., the portion of the link from the PSE to the PD). The term "powered device" (PD) generally refers to a device that is either drawing power or requesting power from a PSE. In a simple example, a communication link as used herein may be an Ethernet cable coupling PSE and PD to each other.

It shall be understood that the powered device, the method of operating a powered device and the computer program for operating a powered device have similar and/or identical preferred embodiments as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
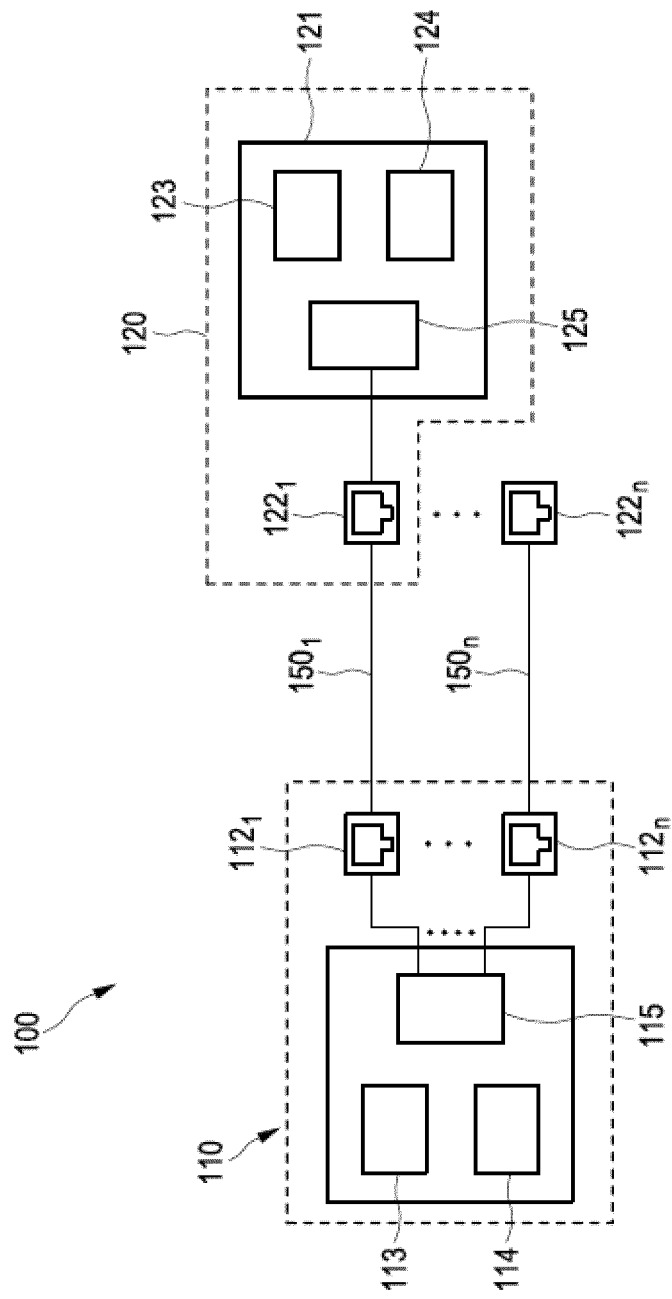
FIG. 1 shows a typical layout of a PoE system.

FIG. 1 shows a typical layout of a PoE system 100 comprising a power sourcing equipment (PSE) 110 and a PoE load 120 comprising a powered device (PD) 121. A PoE connection may be implemented by means of a so called patch cable $150_1, \ldots, 150_n$ between one of a plurality of output jacks or ports $112_1, \ldots, 112_n$ of the PSE 110 and an input jack or port $122_1, \ldots, 122_n$ of the PD 121. In PoE systems, typically PSE power supply unit 113 and PD power supply unit 123 (for receiving the power from the PSE and supplying it to the load) as well as PSE data processing unit 114 and PD data processing unit 124 share the same PoE connection $150_1, \ldots, 150_n$. In multi-load systems, each load is connected to a separate one of the plurality of output ports comprising a first port $112_1$ to an n-th port $112_n$ of PSE 110, while PSE control unit 115 is configured to control the correct powering. Thus, each load, such as PD 121, indicates separately the suitability for receiving power over the Ethernet connection and negotiates separately the availability of required power with PSE 110. This requires a PD control unit 125 in each PD 121. On the side of PSE 110, PSE control unit 115 supervises the negotiations on all ports.

In accordance with IEEE standard 802.3af, which does not support the autoclass feature, a PD may be classified by the PSE based on the classification information provided by the PD. By classifying a PD, it is intended to inform the PSE about the maximum power required by the PD during operation. Class 0 is the default for PDs. Classes 1 to 3 may be used for alternative power management scenarios at the PSE. Classification of a PD is based on power. The classification of the PD is the maximum power that the PD will draw across all input voltages and operational modes. A PD returns Class 0 to 3 in accordance with the maximum power draw. Specifically, the standard requires that the PD presents one, and only one, classification signature during classification. Consequently, in the original idea of PoE, this classification data is used for power budgeting proposes of the PSE.

The following table lists some 802.3 at power classifications and classification signatures (i.e., classification currents), measured at a PD input connector:

| Class | Power | Classification current |
|---|---|---|
| 0 | 0.44 to 12.96 W | 0 to 4 mA |
| 1 | 0.44 to 3.84 W | 9 to 12 mA |
| 2 | 3.84 to 6.49 W | 17 to 20 mA |
| 3 | 6.49 to 12.95 W | 26 to 30 mA |

The autoclass feature to be introduced in an upcoming IEEE standard 802.3bt, allows a PD to indicate to the PSE that it supports autoclass. If the PSE supports autoclass as well, it will notice that the PD has indicated support for autoclass. The PSE can then assign a provisional power budget (e.g. based on the class the PD is in) and measure the power usage of the PD while it is in maximum power mode. The power used by the PD in maximum power mode, optionally with a safety margin, is then assigned as a power budget for the PD. However, if the PSE does not support autoclass then the PSE will simply allocate power based on the class the PD is in. It is foreseen that the PD cannot distinguish at this stage between a PSE supporting autoclass and a PSE not supporting autoclass. If the PD determines type information related to the PSE, the PD can use this to determine if a power request should be sent to the PSE. If the PSE supports autoclass and a power request is sent, then this power request will overrule the power allocation based on the autoclass feature. As such the benefits of autoclass based power allocation are negated. If the PSE does not support autoclass, then this power request will overrule the power allocation based on classification (i.e. based on the class the PS is in). As such the power allocation can be more accurate.

Figure 2:
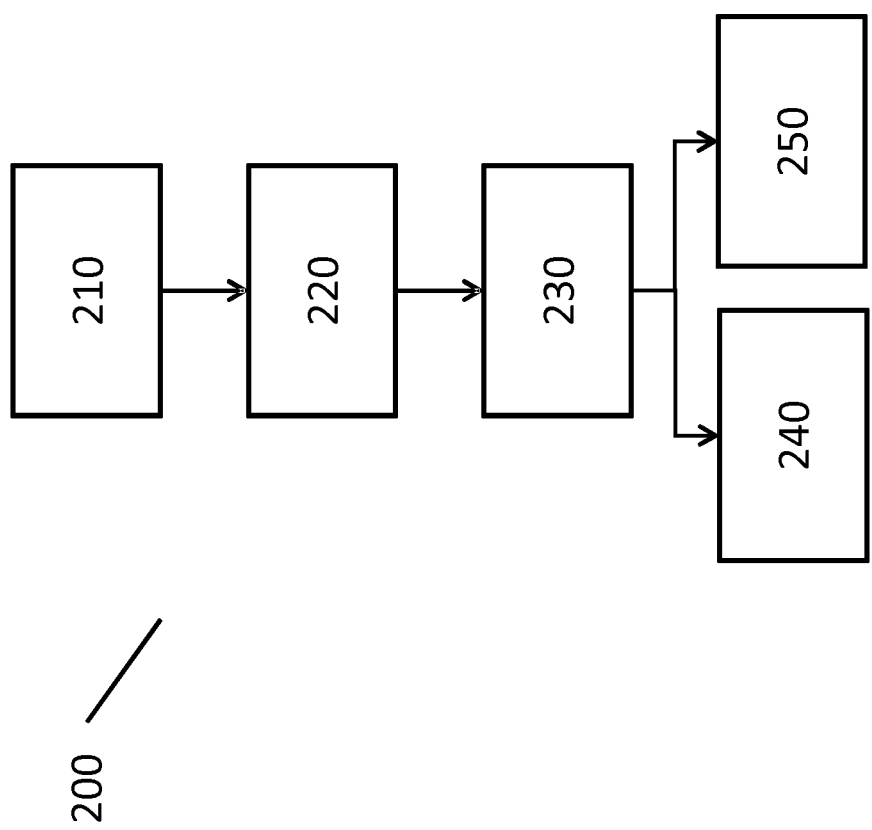
FIG. 2 shows schematically and exemplarily an embodiment of the method according to the invention.

In FIG. 2 an embodiment of the method of operating a powered device according to the invention is shown. The method 200 comprises: classification 210, switching to maximum power mode 220, determining a type information of the PSE 230 and alternatively transmitting a power request 240 or not transmitting a power request 250.

As part of classification 210, the PD provides a classification signature which allows the PSE to determine what class the PD is in and/or that the PD supports autoclass. The PSE then allocates the amount of power associated with this class (as per the PoE standard) to the PD. The PD, supporting the autoclass feature, temporarily switches to a maximum power mode in which it indicates, through power consumption, what the maximum amount of power is it will need during operation. An autoclass supporting PSE will measure the amount of power used by the PD while it is in maximum power mode, and updates its power allocation based on this measurement (e.g. allocate the peak power usage measured plus optionally a fixed or relative safety margin). When a PSE does not support autoclass, the power allocation remains based on the class the PSE has determined the PD to be in. At this stage, the PD is unaware of whether the PSE supports autoclass or not. By determining a type information of the PSE, such as by determining if the PSE supports autoclass the PD can determine whether it should send a power request or not. As an example, the PD receives an LLDP message from the PSE comprising a field that signals the PSE's support for autoclass. If the PD thereby determines the PSE does support autoclass, the PD can withhold sending an LLDP message comprising a power request. If however the PD determines that the PSE does not support autoclass, the PD can send the LLDP message comprising the power request.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium, supplied together with or as part of other hardware, but may also be distributed in other forms, such as via the Internet or other wired or wireless telecommunication systems. The term "computer program" may also refer to embedded software.

Any reference signs in the claims should not be construed as limiting the scope.

The invention claimed is:

1. A powered device for receiving power from a power sourcing equipment via a communication link, the powered device comprising:
    a jack or port arranged for transmitting, over the communication link, a power request,
    wherein the powered device is arranged to be controlled in a maximum power mode during a classification phase of said powered device,
    wherein the powered device is arranged for determining, after implementing said maximum power mode during said classification phase, a type information specifying whether the power sourcing equipment supports autoclass classification mechanism, and
    wherein the jack or port is further arranged for selectively transmitting the power request based on the determined type information, wherein the powered device is arranged to withhold sending the power request in response to determining that the type information indicates support of the power sourcing equipment for the autoclass classification mechanism.

2. The powered device as defined in claim 1, wherein the powered device is arranged for determining the type information based on power received from the power sourcing equipment via the communication link.

3. The powered device as defined in claim 1, wherein the powered device is arranged for determining the type information based on type indicator data received.

4. The powered device as defined in claim 3, wherein the type indicator data is received via the communication link.

5. The powered device as defined in claim 4, wherein the type indicator data is received from the power sourcing equipment.

6. The powered device as defined in claim 4, wherein the type indicator data is received as a Link Layer Discovery Protocol message.

7. A method of operating a powered device for receiving power from a power sourcing equipment via a communication link, the method comprising:
    providing a classification information to the communication link;
    controlling the powered device in a maximum power mode during a predetermined period;
    determining, after implementing said maximum power mode during said predetermined period, a type information specifying whether the power sourcing equipment supports autoclass classification mechanism; and
    determining whether to selectively transmit a power request based on the determined type information, wherein the power request is withheld in response to determining that the type information indicates support of the power sourcing equipment for the autoclass classification mechanism.

8. A non-transitory computer-readable storage medium comprising a computer program code configured to cause a computer to perform the method of claim 7 when the computer runs the code on the powered device.

9. A method of operating a powered device for receiving power from a power sourcing equipment via a communication link, the method comprising:
    providing a classification information to the communication link;
    determining a type information specifying support of the power sourcing equipment for autoclass classification mechanism; and
    selectively transmitting a power request based on the determined type information, wherein the power request is transmitted when the determined type information indicates support of the power sourcing equipment for the autoclass classification mechanism and when maximum power is not available to the powered device during a classification phase.

* * * * *